US010375453B2

(12) United States Patent
Pulitzer et al.

(10) Patent No.: US 10,375,453 B2
(45) Date of Patent: Aug. 6, 2019

(54) DEVICE FOR INDUSTRY-SPECIFIC CONTENT STREAMING

(71) Applicant: Digital Broadcasting and Communications Network, LLC, Los Angeles, CA (US)

(72) Inventors: Jovan Hutton Pulitzer, Frisco, TX (US); James Strader, Austin, TX (US)

(73) Assignee: Digital Broadcasting and Communications Network, LLC, Austin, TX (US)

( * ) Notice: Subject to any disclaimer, the term of this patent is extended or adjusted under 35 U.S.C. 154(b) by 0 days.

(21) Appl. No.: 15/908,090

(22) Filed: Feb. 28, 2018

(65) Prior Publication Data

US 2018/0249226 A1 Aug. 30, 2018

Related U.S. Application Data

(60) Provisional application No. 62/464,999, filed on Feb. 28, 2017, provisional application No. 62/464,997, filed on Feb. 28, 2017, provisional application No. 62/464,998, filed on Feb. 28, 2017.

(51) Int. Cl.

| | |
|---|---|
| ***H04N 21/845*** | (2011.01) |
| ***G06Q 20/20*** | (2012.01) |
| ***H04L 29/06*** | (2006.01) |
| ***G06F 16/28*** | (2019.01) |
| ***H04N 21/262*** | (2011.01) |

(52) U.S. Cl.

CPC ....... *H04N 21/8456* (2013.01); *G06F 16/285* (2019.01); *G06Q 20/203* (2013.01); *H04L 65/4084* (2013.01); *H04N 21/26241* (2013.01)

(58) Field of Classification Search

None

See application file for complete search history.

(56) References Cited

U.S. PATENT DOCUMENTS

| | | | | |
|---|---|---|---|---|
| 9,357,179 | B2 * | 5/2016 | Haberman | G06Q 30/02 |
| 2003/0070169 | A1 * | 4/2003 | Beyers, II | H04N 7/17318 725/51 |
| 2011/0231569 | A1 * | 9/2011 | Luby | H04N 21/23106 709/234 |
| 2015/0154597 | A1 * | 6/2015 | Bacastow | G06Q 20/4012 705/72 |
| 2016/0192029 | A1 * | 6/2016 | Bergstrom | H04L 43/0882 725/109 |
| 2017/0061409 | A1 * | 3/2017 | Morecki | G06Q 50/01 |
| 2017/0064397 | A1 * | 3/2017 | Iyer | H04N 21/4755 |
| 2017/0187768 | A1 * | 6/2017 | Huang | H04L 65/4084 |

* cited by examiner

*Primary Examiner* — James R Marandi

(57) ABSTRACT

A device for industry-specific content streaming includes a network interface, a display, a memory, and at least one processor coupled to the network interface and the memory. The at least one processor is configured to transmit a request for a digital content item to a remote server, wherein the digital content item is classified according to a specific classification code, receive a manifest file associated with the digital content item, wherein the manifest file includes a location for at least one segment file associated with the digital content item, determine using the manifest file a location on the remote server of a segment file, transmit to the remote server a request for the segment file stored on the remote server, receive the segment file in response to the request for the segment file, and present contents of the segment file on the display of the electronic device.

14 Claims, 12 Drawing Sheets

DEVICE FOR INDUSTRY-SPECIFIC CONTENT STREAMING

CROSS-REFERENCE TO RELATED APPLICATIONS

This application claims the benefit of and/or priority to U.S. Provisional Patent Application No. 62/464,997, filed Feb. 28, 2017, and entitled SYSTEM AND METHOD FOR BROADCASTING INDUSTRY SPECIFIC CONTENT USING STANDARD INDUSTRIAL CLASSIFICATION CODES. This application also claims the benefit of and/or priority to U.S. Provisional Patent Application No. 62/464,998, filed Feb. 28, 2017, and entitled SYSTEM AND METHOD FOR BROADCASTING INDUSTRY-SPECIFIC CONTENT TO PHARMACIES. This application also claims the benefit of and/or priority to U.S. Provisional Patent Application No. 62/464,999, filed Feb. 28, 2017, and entitled DEVICE FOR USE IN RECEIVING INDUSTRY-SPECIFIC BROADCASTS. The contents of 62/464,997, 62/464,998, and 62/464,999 are incorporated by reference herein in their entirety.

TECHNICAL FIELD

The following disclosure relates to a device for industry-specific content streaming.

SUMMARY

In one aspect thereof, a device for industry-specific content streaming is provided. The device comprises a network interface, a display, a memory, and at least one processor coupled to the network interface and the memory. The at least one processor configured to transmit over the network interface a request for a digital content item to a remote server, wherein the digital content item is classified according to a specific classification code, receive from the remote server over the network interface a manifest file associated with the digital content item stored on the remote server, wherein the manifest file includes a location on the remote server for at least one segment file associated with the digital content item, determine using the manifest file a location on the remote server of a segment file, transmit over the network interface to the remote server a request for the segment file stored on the remote server, receive from the remote server over the network interface the segment file in response to the request for the segment file, and present contents of the segment file on the display of the electronic device.

In some embodiments, the specific classification code is a Standard Industrial Classification code (SIC code).

In some embodiments, the digital content item is one of a plurality of digital content items stored on the remote server.

In some embodiments, the plurality of digital content items is provided according to time-based programming blocks, wherein each of the time-based programming blocks is associated with a classification code and with a particular time of day.

In some embodiments, content from the plurality of digital content items is scheduled within the time-based programming blocks, wherein a classification code associated with the content is matched to the classification code associated with the time-based programming blocks.

In some embodiments, the content scheduled within at least one of the time-based programming blocks is restricted from being requested by the electronic device except during the particular time of day associated the at least one of the time-based programming blocks.

In some embodiments, the at least one processor is further configured to receive, at the particular time of day associated with the at least one of the time-based programming blocks, a manifest file associated with the content scheduled within the at least one of the time-based programming blocks, and transmit a request, using the manifest file associated with the content scheduled within the at least one of the time-based programming blocks, for a segment file associated with the content scheduled within the at least one of the time-based programming blocks.

In some embodiments, the electronic device is associated with a specific classification code.

In some embodiments, the content scheduled within at least one of the time-based programming blocks is restricted from being requested by the electronic device unless the classification code associated with the electronic device matches the classification code of the at least one of the time-based programming blocks.

In some embodiments, the electronic device is connected to a point-of-sale (POS) system.

In some embodiments, the at least one processor is further configured to receive data from the POS system concerning a product or service sold, determine if the data indicates a trend in the products or services sold, and transmit the data to the remote server so that the remote server updates the content scheduled within the time-based programming blocks according to the trend.

In some embodiments, updating the content scheduled within the time-based programming blocks according to the trend includes replacing certain content within at least one of the time-based programming blocks with content including subject matter pertaining to the trend.

In some embodiments, the electronic device further comprises an infrared (IR) receiver for receiving commands from a peripheral IR transmitter.

In some embodiments, the electronic device is restricted from uses other than content streaming.

In some embodiments, the at least one processor is further configured to repeat, until all segment files associated with the manifest file are received by the electronic device transmitting a request for another segment file stored on the remote server, receiving from the remote server over the network interface the another segment file in response to the request for the another segment file, and presenting contents of the another segment file on the display of the electronic device.

BRIEF DESCRIPTION OF THE DRAWINGS

For a more complete understanding, reference is now made to the following description taken in conjunction with the accompanying Drawings in which.

DETAILED DESCRIPTION

Figure 1:
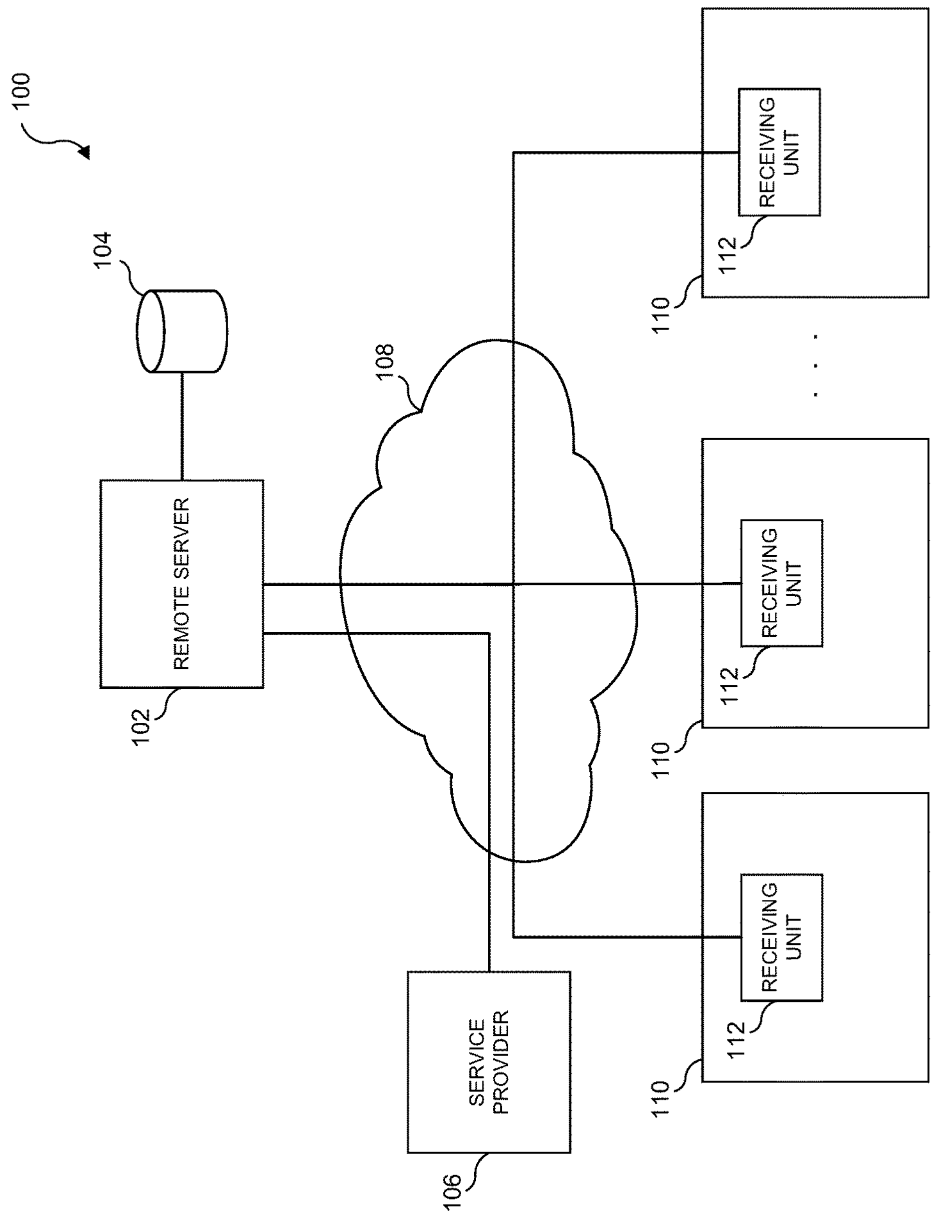
FIG. 1 illustrates a diagrammatic representation of one embodiment of an industry-specific content streaming system.

Referring now to FIG. 1, there is illustrated a diagrammatic representation of one embodiment of an industry-specific content streaming system 100. The system 100 includes a remote server 102 having a database 104. The database 104 can be local to the remote server 102 or can be accessed remotely by the remote server 102. The remote server 102 and the database 104 may be managed by a service provider 106. The service provider 106 may connect to the remote server 102 locally, or the remote server 102 may be situated remotely from the service provider 106, with the service provider 106 connecting to the remote server 102 over a network 108, such as the Internet, such as if the remote server 102 is a cloud-based server on which a service, program, or platform is stored and executed. The system 100 also includes a plurality of end user locations 110. End user locations may be commercial locations such as retail stores, business offices, doctor's offices, pharmacies, or other commercial locations. Each of the plurality of end user locations 110 also includes a receiving unit 112. The receiving unit 112 may be an electronic device capable of receiving information from the remote server 102 when the receiving unit 112 is connected to the remote server 102 over the network 108. For instance, in some embodiments, a receiving unit 112 may be a television configured to receive information from the remote server 102. The receiving unit 112 may also be any other computing or mobile device, such as desktop computers, laptops, smartphones, or other devices.

In some embodiments, the information received by the receiving unit 112 may be multimedia content, such as video or audio data, images, presentations, or other content. In some embodiments, information sent to the receiving units 112 may be multimedia content that is customized for specific types of end user locations 110. For example, if an end user location 110 is a pharmacy, a Standard Industrial Classification code (SIC code) for pharmacies can be associated with the end user location 110. SIC codes provide a system for classifying industries by a four-digit code. It is often used by government agencies to classify industry areas. The SIC codes can be grouped into progressively broader industry classifications: industry group, major group, and division. The first 3 digits of the SIC code indicate the industry group, and the first two digits indicate the major group. Each division encompasses a range of SIC codes. A six-digit North American Industry Classification System (NAICS code) is sometimes used instead of a SIC code. It will be understood that the system and methods described herein may also use NAICS codes or other similar codes without departing from the spirit and scope of this disclosure. SIC code ranges and their associated divisions are shown in Table 1.

TABLE 1

| Range of SIC Codes | Division |
|---|---|
| 0100-0999 | Agriculture, Forestry and Fishing |
| 1000-1499 | Mining |
| 1500-1799 | Construction |
| 1800-1999 | not used |
| 2000-3999 | Manufacturing |
| 4000-4999 | Transportation, Communications, Electric, Gas and Sanitary service |
| 5000-5199 | Wholesale Trade |
| 5200-5999 | Retail Trade |
| 6000-6799 | Finance, Insurance and Real Estate |
| 7000-8999 | Services |
| 9100-9729 | Public Administration |
| 9900-9999 | Nonclassifiable |

For example, a SIC code related to pharmacies could be passed to the remote server 102, so that the remote server 102 can serve content that is specific to the pharmacy industry to a pharmacy. In some embodiments, the end user location 110 may have an ID that is associated with a particular SIC code at the remote server 102 and/or within the database 104. The remote server 102 may have stored thereon a plurality of content and/or programming associated with the SIC code so that content specific to the industry may be served to the end users' receiving units. For instance, if an end user location 110 has a SIC code related to the automotive repairs industry, that end user location 110 may receive at its receiving unit 112 multimedia content concerning developments in the automotive repair industry, such as new and useful automotive parts, new ways automobiles are being designed and built, news related to the automotive industry, tips concerning automotive repairs billing practices, or other information. If an end user location 110 has a SIC code related to pharmacies, that end user location 110 may receive at its receiving unit 112 multimedia content concerning new drug development, proper medication filling practices, drug information and side effects, or other information.

Figure 2:
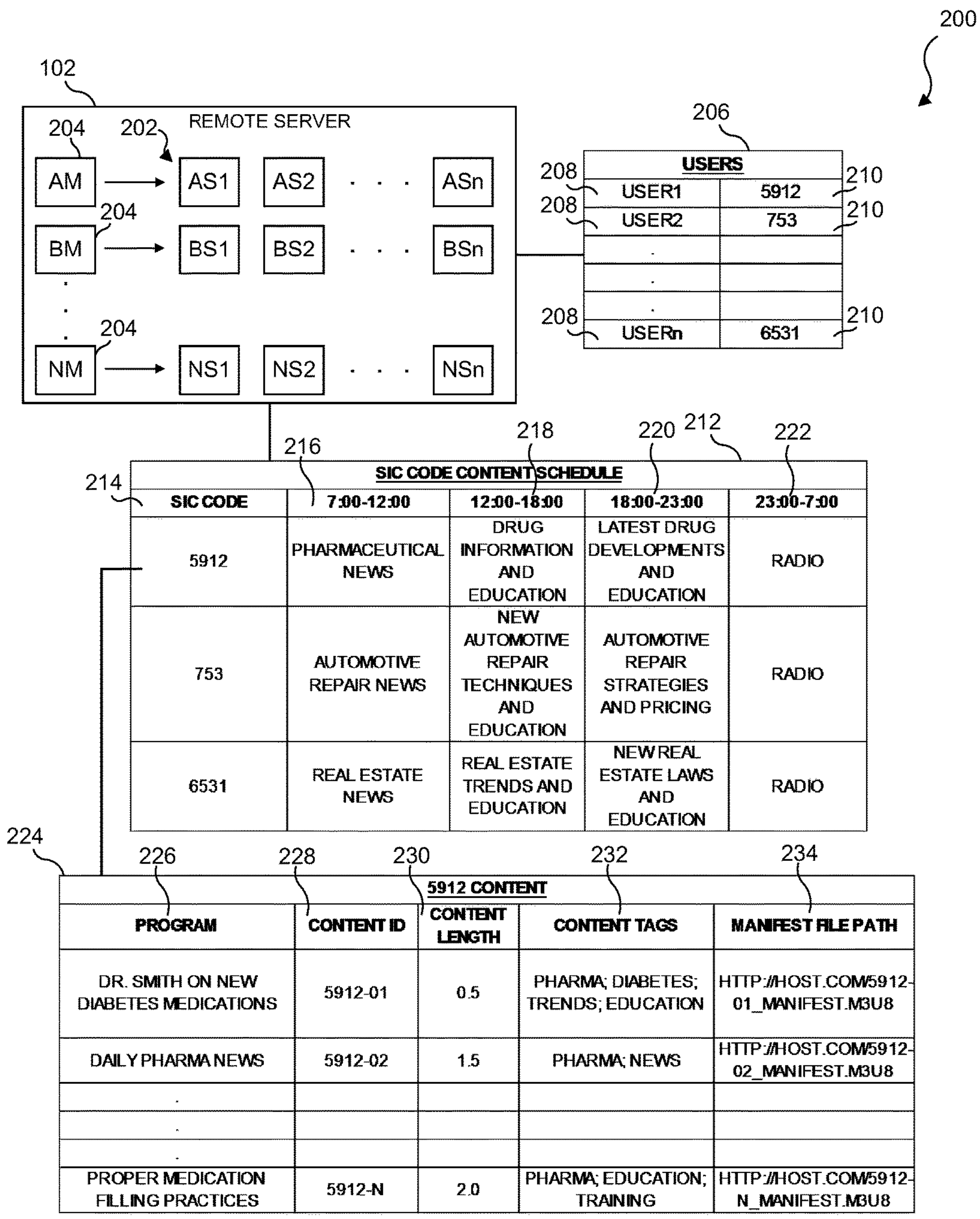
FIG. 2 illustrates a diagrammatic view of one embodiment of a server side multimedia storage and end user Standard Industrial Classification code (SIC code) organization system.

Referring now to FIG. 2, there is illustrated a diagrammatic view of one embodiment of a server side multimedia storage and end user SIC code organization system 200. The system 200 includes the server 102. The remote server 102 has stored thereon a plurality of multimedia content. The multimedia content may be organized in such a way as to allow streaming of the content to the receiving units 112. In some embodiments, each item of content may be divided into segment files 202 for transfer and streaming. The remote server 102 may also have stored thereon a plurality of manifest files, also known as index files, with each of the plurality of manifest files 204 being associated with an item of content. The manifest file contains information, such as a URL, for all the segment files associated with a particular item of content, the information allowing for those segment files to be located on and downloaded from the remote server 102 or any other location they may be stored. Thus, as shown in FIG. 2, one of the plurality of manifest files 204 is labeled "AM," with manifest file AM being associated with, and including within information for, segment files AS1, AS2, and so on through ASn, wherein 'n' is the number of the last segment file. For example, if the manifest file AM is the manifest file for a 28 minute video, and the video is divided into segment files that are four seconds in length, n=420 for this item of content because there would be 420 four-second segment files for the entire 28 minute video.

All content stored on the remote server 102 may be stored in this way, as shown in FIG. 2. There is shown in FIG. 2 other manifest files and their associated segment files, with the manifest file labeled BM being associated with segment files BS1, BS2, and through BSn. The remote server 102 may have any number of manifests and their associated segment files, as indicated in FIG. 2 with manifest file NM and its associated segment files NS1, NS2, and NSn, where N represents the last manifest file and group of segment files for that manifest file and n is the last segment file within that group. It will be understood that the 'N' and 'n' identifiers used in FIG. 2 are not meant to necessarily relate to each other or designate the same number. For instance, even though there is listed both an ASn and a BSn segment file, n for ASn may equal 200 while the n for BSn may equal 10. Similarly, 'N' and 'n' do not necessarily represent the same number, as there may be 200 manifest files stored overall on the remote server 102, but 1000 segment files for a particular item of content.

A manifest file may contain certain information including the location of segment files for a particular item of content, as shown in the example manifest file text below:

```
#EXTM3U
#EXT-X-MEDIA-SEQUENCE:0
#EXT-X-TARGETDURATION:10
#EXTINF:10,
HTTP://MEDIA.HOST.COM/5912-01_SEGMENT1.WEBM
#EXTINF:10,
HTTP://MEDIA.HOST.COM/5912-01_SEGMENT2.WEBM
.
.
.
#EXTINF:10,
HTTP://MEDIA.HOST.COM/5912-01_SEGMENTN.WEBM
#EXT-X-ENDLIST
```

The remote server 102 may also have stored thereon or associated therewith, such as within the database 104, information pertaining to the end user locations 110, their associated SIC codes, and programming information for those SIC codes. There is shown in FIG. 2 a USERS table 206. The table 206 includes a plurality of user names or IDs 208 having associated therewith a SIC code 210. There is shown in FIG. 2 a USER1 having a SIC code of 5912 (drug stores and proprietary stores), a USER2 having a SIC code of 753 (automotive repair shops), and a USERn having a SIC code of 6531 (real estate agents and managers). It will be understood that any number of users, stored via name, ID, or other means, having any SIC code may be stored.

The remote server 102 may also have stored thereon or associated therewith, such as within the database 104, a content schedule or programming schedule based on SIC code, shown in FIG. 2 as a SIC code content schedule table 212. The table 212 includes a SIC CODE column 214 listing within the column 214 various SIC codes. Programming may be customized for the particular SIC code and broken into programming blocks based on time of day. This may be done so that businesses with variable hours will receive content at the appropriate times, or if certain types of businesses have lower customer volume at a particular time of day, allowing for personnel working for the business to be more likely to be able to view the content at particular times of the day. For instance, if a pharmacy has downtime in the evening, continuing education videos may air so that the personnel can pay more attention and learn from the video. During peak hours when personnel are the busiest, content such as news that may not require as much attention from the personnel may air. Programming blocks may be divided by period of the day in this manner.

For example, in some embodiments, and as illustrated in FIG. 2, there may be a programming block from 7:00-12:00 during the day (column 216 of table 212), a programming block from 12:00-18:00 (column 218 of table 212), a programming block from 18:00-23:00 (column 220 of table 212), and a programming block from 23:00-7:00 (column 222 of table 212). It will be understood that while FIG. 2 shows the same programming blocks for the shown SIC codes, different programming blocks may be assigned to each particular SIC code. Table 212 shows that SIC code 5912 has programming specific to the SIC code (drug stores and proprietary stores), including pharmaceutical news airing during the 7:00-12:00 programming block, drug information and education content airing during the 12:00-18:00 programming block, the latest drug developments and education content airing during the 18:00-23:00 programming block, and radio content airing during the 23:00-7:00 programming block. Radio content may be filler content that airs during hours that the type of business is usually closed, and may include music, talk shows related to the SIC code, or other content.

Different programs, or shows, may be within a programming block, with the programs airing during the programming block being related to the theme of the programming block. A 5912 SIC code content table 224 is shown, which includes information on the types of content that may appear and is related to SIC code 5912 (drug stores and proprietary stores). The table 224 includes a program column 226 including the names of various programs or shows. The table 224 also includes a content ID under a content ID column 228 used for easily identifying a specific program. The table 224 also includes a content length column 230 which includes the length of a given program, in hours. It will be understood that content length may be represented in units other than hours, such as minutes or seconds. A content tags column 232 lists tags associated with a particular program. The table 224 may also include a manifest file path column 234, which includes the URL, file path, or other location for the manifest file.

For example, in the example shown in FIG. 2, the program column 226 includes a program titled "Dr. Smith on New Diabetes Medications." This program has a content ID of 5912-01 and a length of 0.5 (30 minutes). This program is tagged with the tags "pharma; diabetes; trends; education." The manifest file path is listed as "http://host.com/5912-01_manifest.m3u8." This program may air during blocks having a theme associated with the tags, such as during the 18:00-23:00 programming block shown in table 212, which the theme is on the latest drug developments and education.

Another example is shown in table 224 of a program titled "Daily Pharma News." This program has a content ID of 5912-02 and a length of 1.5 (one and a half hours). This program is tagged with the tags "pharma; news." The manifest file path is listed as "http://host.com/5912-02_manifest.m3u8." This program may air during blocks having a theme associated with the tags, such as during the 7:00-12:00 programming block shown in table 212, the theme for which is pharmaceutical news.

Yet another example is shown in table 224 of a program titled "Proper Medication Filling Practices." This program has a content ID of 5912-n (n representing the number for the last 5912-related content currently in the system) and a length of 2.0 (two hours). This program is tagged with the tags "pharma; education; training." The manifest file path is listed as "http://host.com/5912-n_manifest.m3u8." This allows for the manifest file to be retrieved when the particular program is to be played or streamed to a receiving unit 112, with the manifest file providing links to the segment files. This program may air during blocks having a theme associated with the tags, such as during the 12:00-18:00 programming block shown in table 212, the theme for which is drug information and education. Programs listed in table 224, including those not shown, may be scheduled within a programming block until that programming block is full. This allows for a full day's programming to be scheduled by filling each programming block with content. The service provider 106 may decide how to arrange content for the programming blocks. In some embodiments, an on-demand feature may be implemented that allows for the end users to select particular content from within the content listed in table 224 to watch as they please.

Other content similar to the examples shown in table 224 may be included for other subjects and SIC codes. For example, as shown in table 212, there is included two other SIC codes, 753 (automotive repair shops) and 6531 (real estate agents and managers). Table 212 shows that SIC code 753 has programming blocks specific to the SIC code, with automotive repair news airing during the 7:00-12:00 programming block, new automotive repair techniques and education content airing during the 12:00-18:00 programming block, automotive repair strategies and pricing content airing during the 18:00-23:00 programming block, and radio content airing during the 23:00-7:00 programming block. Radio content may be filler content that airs during hours that the type of business is usually closed, and may include music, talk shows related to the SIC code, or other content. Programs related to SIC code 753 may be stored and organized in a similar manner as that shown in table 224.

Table 212 also shows that SIC code 6531 has programming blocks specific to the SIC code, with real estate news airing during the 7:00-12:00 programming block, real estate trends and education content airing during the 12:00-18:00 programming block, new real estate laws and education content airing during the 18:00-23:00 programming block, and radio content airing during the 23:00-7:00 programming block. Programs related to SIC code 6531 may be stored and organized in a similar manner as that shown in table 224.

It will be understood that the tables shown in FIG. 2 are visually representative of the type of data that may be stored on remote server 102 and/or within the database 104 and the relationship of the data to other data, but may not be necessarily organized in table format. Rather, it will be understood that the data may be organized in a relational database or via other means so that SIC codes may be linked to particular content and to particular end users. Additionally, it will be understood that the SIC codes and their associated programs and programming blocks shown in FIG. 2 are used for example purposes, and other SIC codes and associated content may be used.

Figure 3:
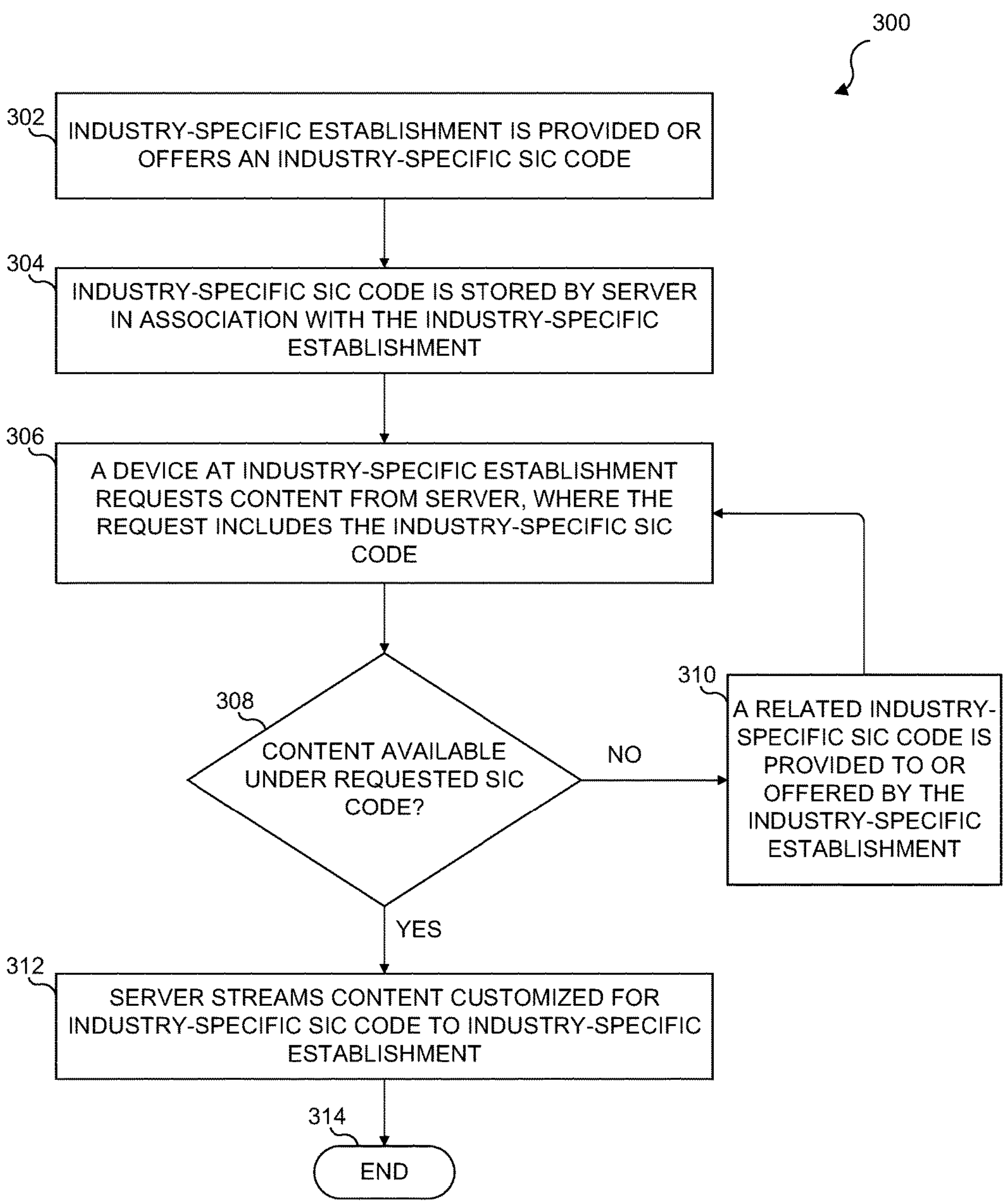
FIG. 3 illustrates a flowchart of one embodiment of a SIC code assignment process.

Referring now to FIG. 3, there is illustrated a flowchart of one embodiment of a SIC code assignment process 300. The process 300 begins at step 302 where an industry-specific establishment, such as an end user location 110, is provided with, or offers its own, industry-specific SIC code. In some embodiments, the service provider 106 may provide a SIC code to an end user if the end user is unsure of their SIC code, or if the service provider 106 has a policy of providing SIC codes to establishments. In other embodiments, the end user may provide a SIC code if they wish, or if they feel that a SIC code provided by the service provider is not accurate. The process then flows to step 304, where the industry-specific SIC code is stored by the remote server 102 in association with the industry-specific establishment. At step 306, a device at the industry-specific establishment, such as the receiving unit 112, requests content from the remote server 102, the request including the industry-specific SIC code.

At decision block 308, it is determined whether there is currently content on the remote server 102 that is related to or available under the requested SIC code. If not, the process flows to step 310 where a related industry-specific SIC code is either provided to or offered by the industry-specific establishment. The process then flows back to step 306 to again request content using the SIC code. This enables the industry-specific establishment to receive content with subject matter closest to its industry that is available from the service provider 106. If at decision block 308 it is determined that content is available under the requested SIC code, the process flows to step 312 where the server streams content customized for the industry-specific SIC code to the industry-specific establishment. The process 300 then ends at step 314.

Figure 4:
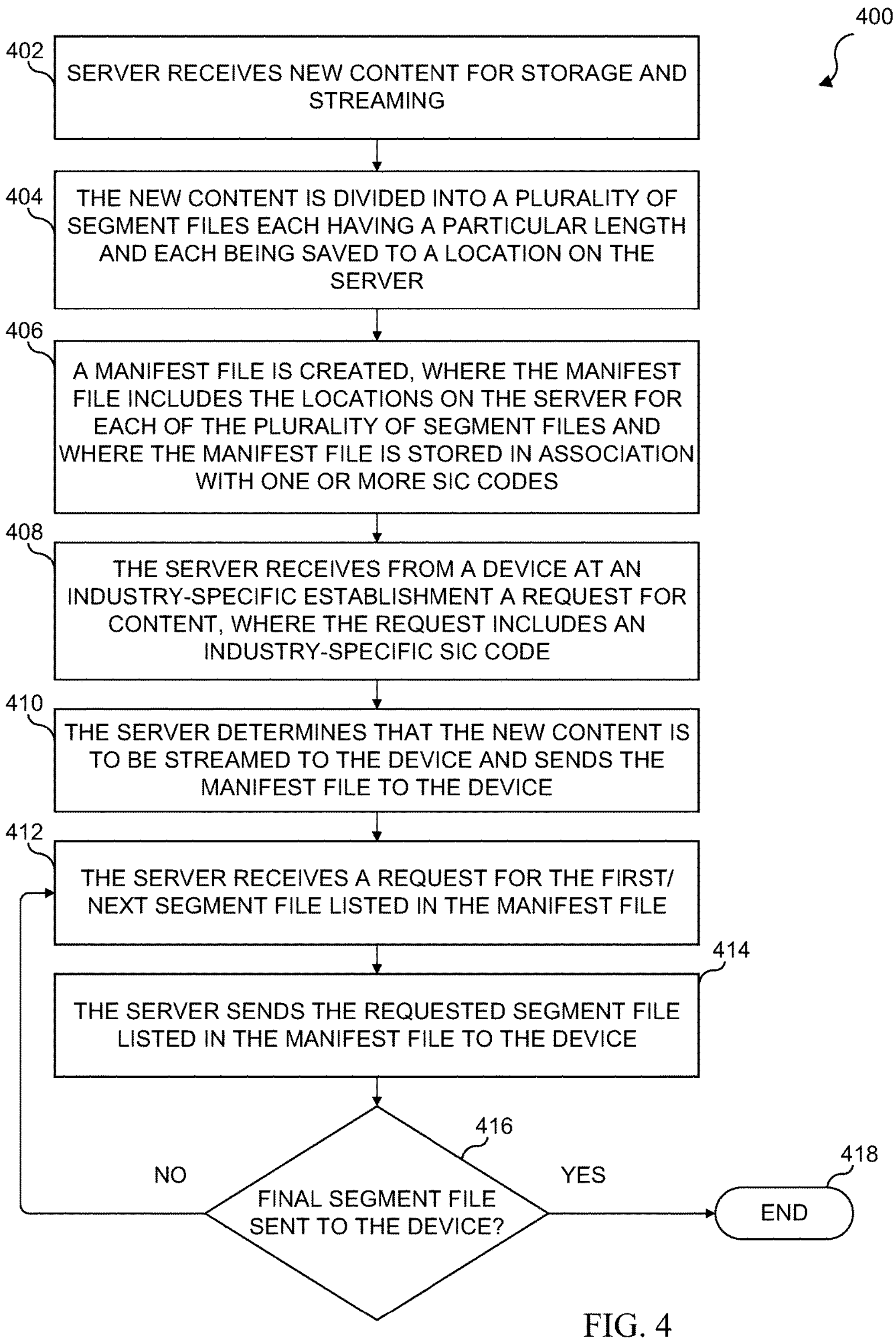
FIG. 4 illustrates a flowchart of one embodiment of a SIC code related content streaming process.

Referring now to FIG. 4, there is illustrated a flowchart of one embodiment of a SIC code related content streaming process 400. The process 400 begins at step 402 where the server receives new content, such as a video, for storage and streaming by the server. At step 404, the new content is divided into a plurality of segment files each having a particular length and each being saved to a location on the server. In other embodiments, the plurality of segment files may be stored elsewhere, such as another remote server or other storage location. The process then flows to step 406 where a manifest file is created, the manifest file including the locations on the server or elsewhere for each of the plurality of segment files and the manifest file being stored in association with one or more SIC codes, for example such as that shown with respect to FIG. 2.

The process 400 then flows to step 408, where the server receives from a device at an industry-specific establishment, such as a receiving unit 112, a request for content, the request including an industry-specific SIC code. At step 410, the server determines that the new content or other already stored and segmented content is to be streamed to the device and sends the manifest file associated with the content to the device. At step 412, the server receives a request for the first/next segment file listed in the manifest file. At step 414, the server sends the segment filed requested by the device in step 412 to the device. The process then flows to decision block 416 where it is determined whether the final segment file listed in the manifest file has been sent to the device. If so, the process ends at step 418. If not, the process flows back to step 412 where the next segment file in the manifest file is requested and then flows to step 414 where the next segment file is sent to the device. This is repeated until all segment files listed in the manifest file are sent to the device. As each segment file is received by the device, the device plays back the segment file.

Figure 5:
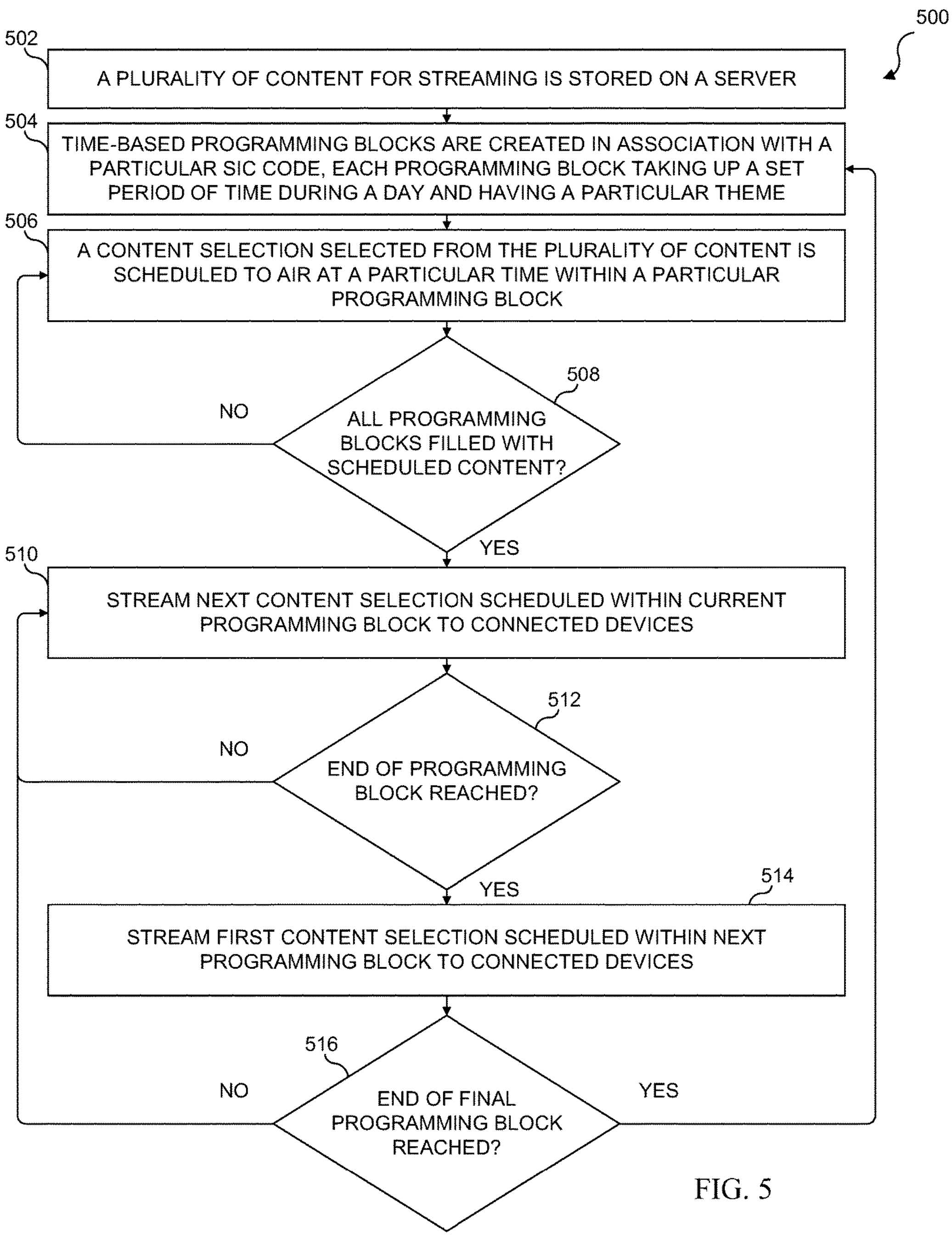
FIG. 5 illustrates a flowchart of one embodiment of a process for content streaming in accordance with a programming block.

Referring now to FIG. 5, there is illustrated a flowchart of one embodiment of a process 500 for content streaming in accordance with a programming block. The process 500 begins at step 502 where a plurality of content for streaming is stored on a server. This stored plurality of content may include various items of content and each item may already be segmented into segment files and have an associated manifest file. At step 504, time-based programming blocks are created in association with a particular SIC code, each programming block taking up a set period of time during a day and having a particular theme, such as the examples shown in FIG. 2. At step 506, a content selection selected from the plurality of content is scheduled to air at a particular time within a particular programming block. The content selected may be in accordance with the type of content that is intended to air during a programming block. Additionally, the length of content may be considered when scheduling content to air during the programming block. For example, if a programming block is three hours long, six 30-minute shows may be scheduled. If the shows do not completely fill a programming block, such as if two minutes are not filled, ads, a short audio clip, or other content may be scheduled for the remaining time. At decision block 508, it is determined whether all the programming blocks have been now filled with scheduled content. If not, the process loops back to step 506 until all programming blocks for a particular day have been filled with content. Once at decision block 508 it is determined that the programming blocks have been filled, the process flows to step 510 where the next content selection scheduled within the current programming block is streamed to connected devices.

At decision block 512 it is determined whether the end of the programming block has been reached, if not, the process flows back to step 510 to stream the next content selection within the current programming block. If so, the process flows to step 514 where the first content selection scheduled within the next programming block is streamed to connected devices. At decision block 516, it is determined whether the end of the final programming block for the day has been reached. If not, the process flows back to step 510 to stream the next content selection within the current programming block. If so, the process flows back to step 504 where new time-based programming blocks are created in association with a particular SIC code. In other embodiments, if it is determined at decision block 516 that the end of the final programming block for the day has been reached, the process may flow back to step 506 instead of step 504, in the event that the times and themes of the programming blocks are not to be changed. The process may continue looping back to step 504 or 506 after decision block 516 indefinitely, with new content being scheduled for streaming every day.

Figure 6:
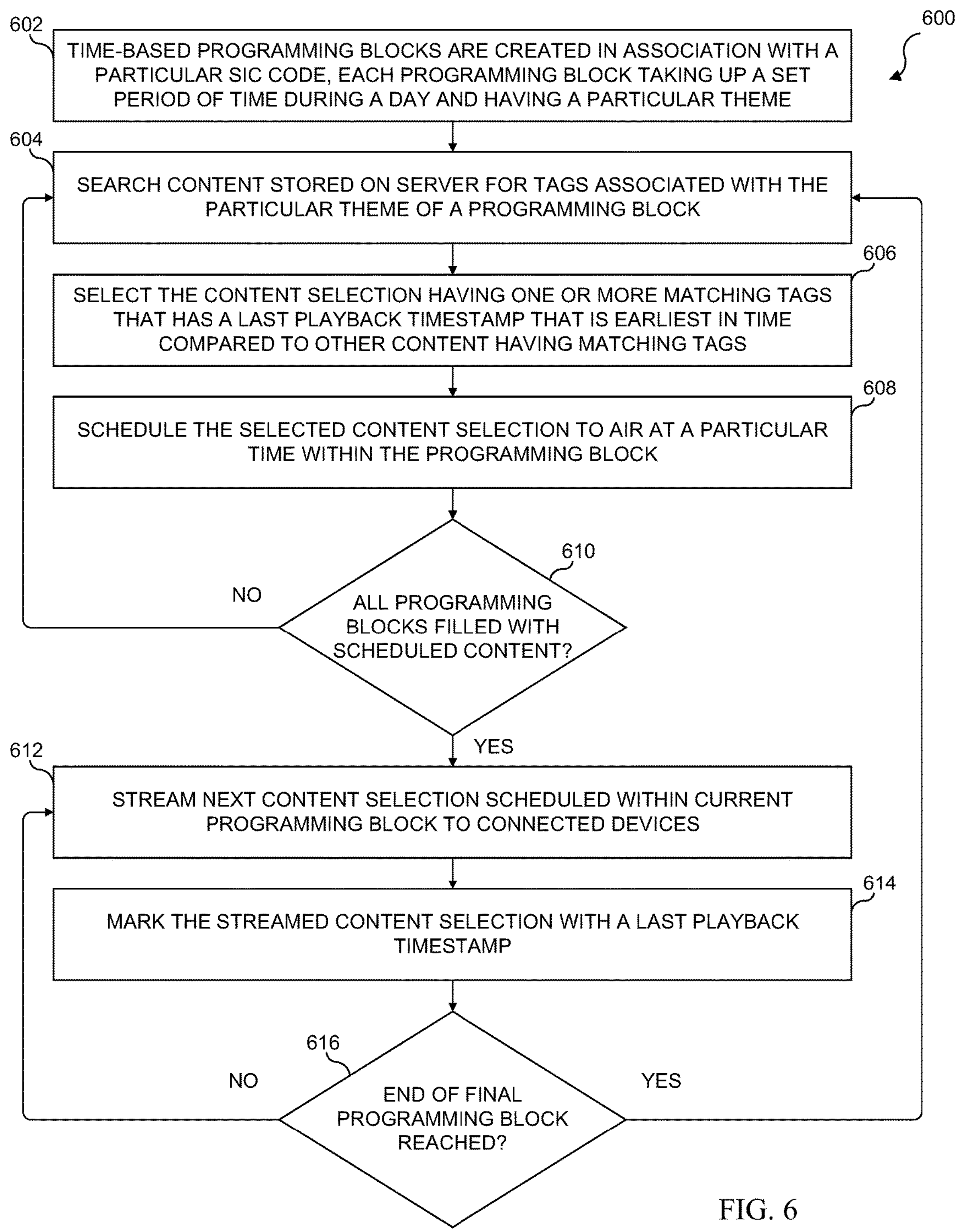
FIG. 6 illustrates a flowchart of one embodiment of a process for dynamically creating a programming block.

Referring now to FIG. 6, there is illustrated a flowchart of one embodiment of a process 600 for dynamically creating a programming block. The process 600 begins at step 602, where time-based programming blocks are created in association with a particular SIC code, each programming block taking up a period of time during a day and having a particular theme. At step 604, content stored on a server to be streamed is searched by tags associated with the content for content having tags that comport with the particular theme of the programming block. For instance, if the theme of the programming block is pharmaceutical advances, tags such as "pharma," "new trends," "education," or other tags may be searched. At step 606, a content selection having one or more matching tags and that has a last playback timestamp that is earliest in time compared to other content having matching tags is selected. The last playback timestamp is a timestamp saved in association with a particular item of content indicating when the content was last scheduled for broadcasting or streaming. This timestamp is compared to the timestamps of other items of content in order to prioritize content that has not aired for a longer period of time than other content. For instance, an item of content that aired a week prior would have priority for scheduling over an item of content that aired one day prior.

The process flows to step 608 where the selected content selection is scheduled to air at a particular time within the programming block. At decision block 610, it is determined whether all programming blocks have been filled with scheduled content. If not, the process flows back to step 604 to perform another search for content. If so, the process flows to step 612 where the next content selection scheduled within the current programming block (according to the current time of day) is streamed to connected devices. At step 614, the content selection streamed at step 612 is marked with a last playback timestamp. At decision block 616, it is determined whether the end of the final programming block has been reached. If not, the process flows back to step 612 to stream the next content selection scheduled within the current programming block. If at decision block 616 the end of the final programming block has been reached, the process flows back to step 604 where new content is searched to refill the programming blocks with new content. In other embodiments, the process may flow from decision block 616 back to step 602 if new programming blocks are to be created having particular air times or themes.

Figure 7:
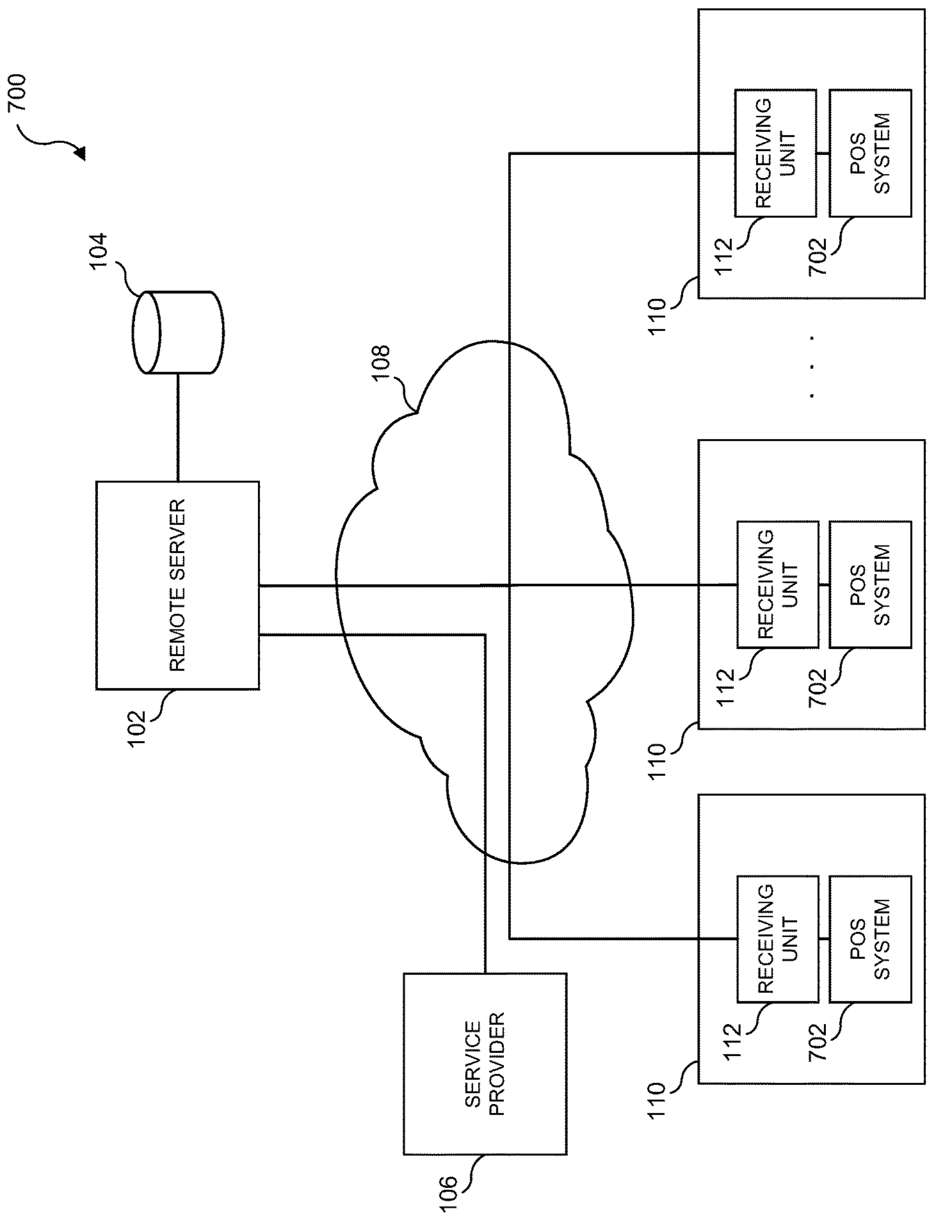
FIG. 7 illustrates a diagrammatic representation of one embodiment of an adaptable industry-specific content streaming system.

Referring now to FIG. 7, there is illustrated a diagrammatic representation of one embodiment of an adaptable industry-specific content streaming system 700. The system 700 illustrates the remote server 102 having a database 104 connected to a service provider 106 over a network 108. The remote server 102 is also shown connected over the network 108 to the plurality of receiving units 112 at the plurality of end user locations 110. Additionally, the plurality of receiving units 112 are connected to a point-of-sale (POS) system 702 at each of the plurality of end user locations 110. The POS system 702 may be a local system maintained at the end user location 110, such as a register connected to a central storage server, to track customer data, sales of products, and other information that the end user locations 110 wish to track. The POS system 702 may also be a distributed system where a network of end user locations (such as a chain of pharmacies) shares data concerning the end user locations, customers, products, and other data.

The receiving unit 112 is connected to the POS system 702 in such a way as to allow the receiving unit 112 to access information tracked and stored by the POS system 702. This allows for content that is streamed to the receiving unit 112 to be further customized according to each individual end user location 110. For example, if a POS system 702 for a pharmacy or drug store tracks and/or stores the National Drug Codes (NDC codes) for pharmaceutical products sold at the end user location 110, the receiving unit 112 for that end user location 110 connected to the POS system 702 may transmit the NDC codes and other information concerning product sales to the remote server 102. The remote server 102 may then alter the content being sent to the receiving unit 112 for the pharmacy.

Figure 8:
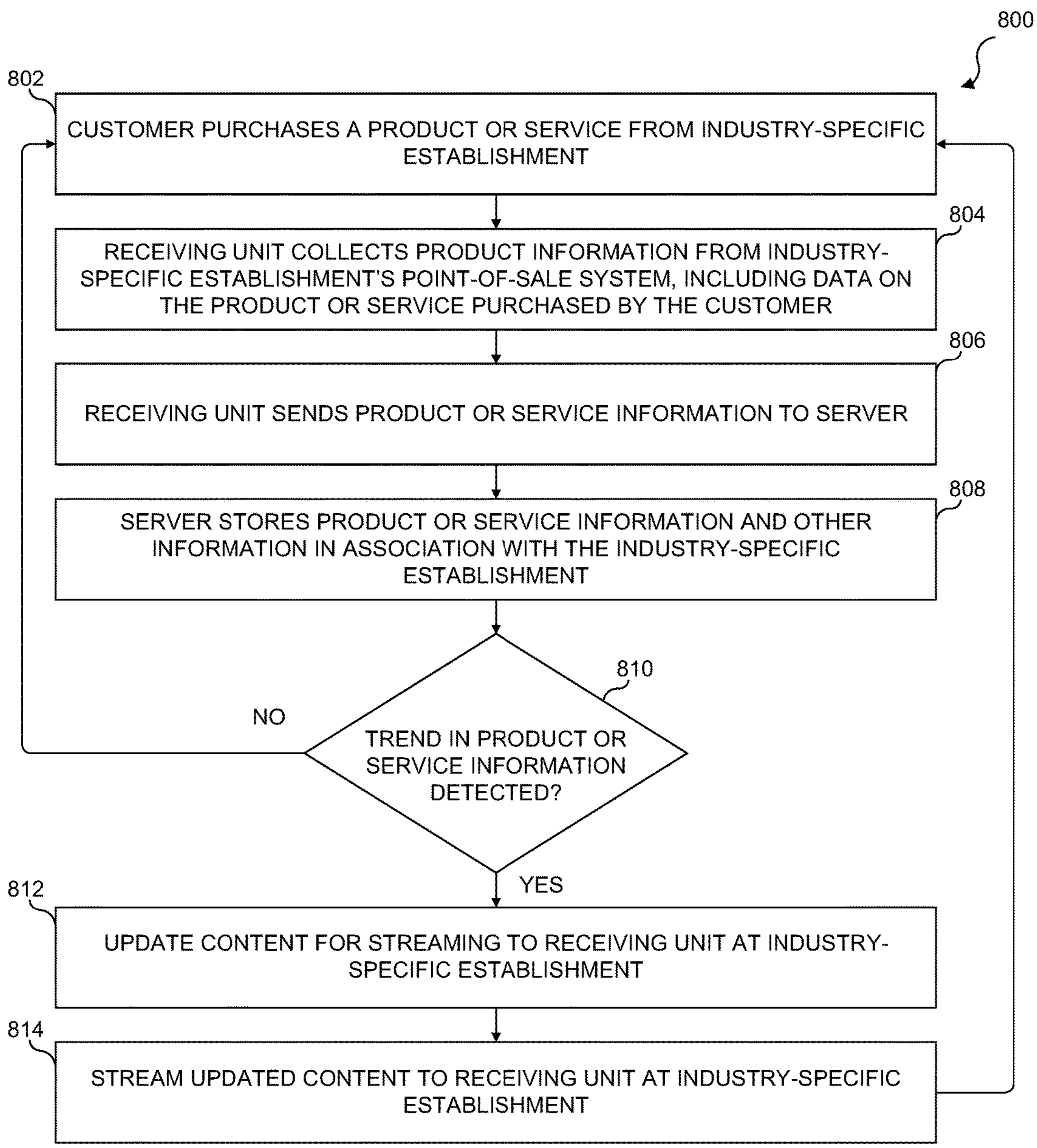
FIG. 8 illustrates an adaptable content streaming process.

Referring now to FIG. 8, there is illustrated an adaptable content streaming process 800. The process begins at step 802 where a customer at an industry-specific establishment purchases a product or service from the industry-specific establishment. At step 804, a receiving unit at the industry-specific establishment collects information from the industry-specific establishment's POS system, including data on the product or service purchased by the customer. This data may be the cost of products or services sold, time of sale, codes associated with the product or service, or other information. For example, if the industry-specific establishment is a pharmacy, the POS system may track or store the NDC codes of medications purchased at the pharmacy. If, for example, a customer purchases a prescription for a beta-blocker, the NDC code for the beta-blocker may be collected by the receiving unit. The process then flows to step 806, where the receiving unit sends the product or service information to the remote server. At step 808, the server stores the product or service information, and any other information collected, in association with the industry-specific establishment.

The process then flows to decision block 810, where it is determined whether there is a trend in product or service information. Such a trend may be according to the types of products being purchased, the price of products sold, or other criteria. For example, if a pharmacy is selling a high level (such as 30% of all medications sold at the pharmacy) of beta-blockers, this may indicate that there may be a significant number of customers purchasing medication to treat heart disease from this particular pharmacy. If it is determined that such a trend exists, the process flows to step 812. At step 812, the content that is scheduled to be streamed to the receiving unit at the industry-specific establishment is updated in accordance with the detected trend. For example, in the beta-blockers example, the content to be streamed may be updated to include more programming concerning known heart disease medications, new beta-blocker medications, advances in heart disease medications, and heart disease risks and treatment in general. In this way, the content being streamed to the industry-specific establishment may be further customized beyond the SIC code to also include content concerning the products and services most often dealt with at the particular industry-specific establishment. At step 814, the updated content is streamed to the receiving unit at the industry-specific establishment. The process then flows back to step 802 to track another purchase at the industry-specific establishment, in order to repeat the steps of process 800 so that trends may continue to be detected and streaming content updated as new trends are detected. If at decision block 810 no trend is detected, the process will also flow back to step 802.

Figure 9A:
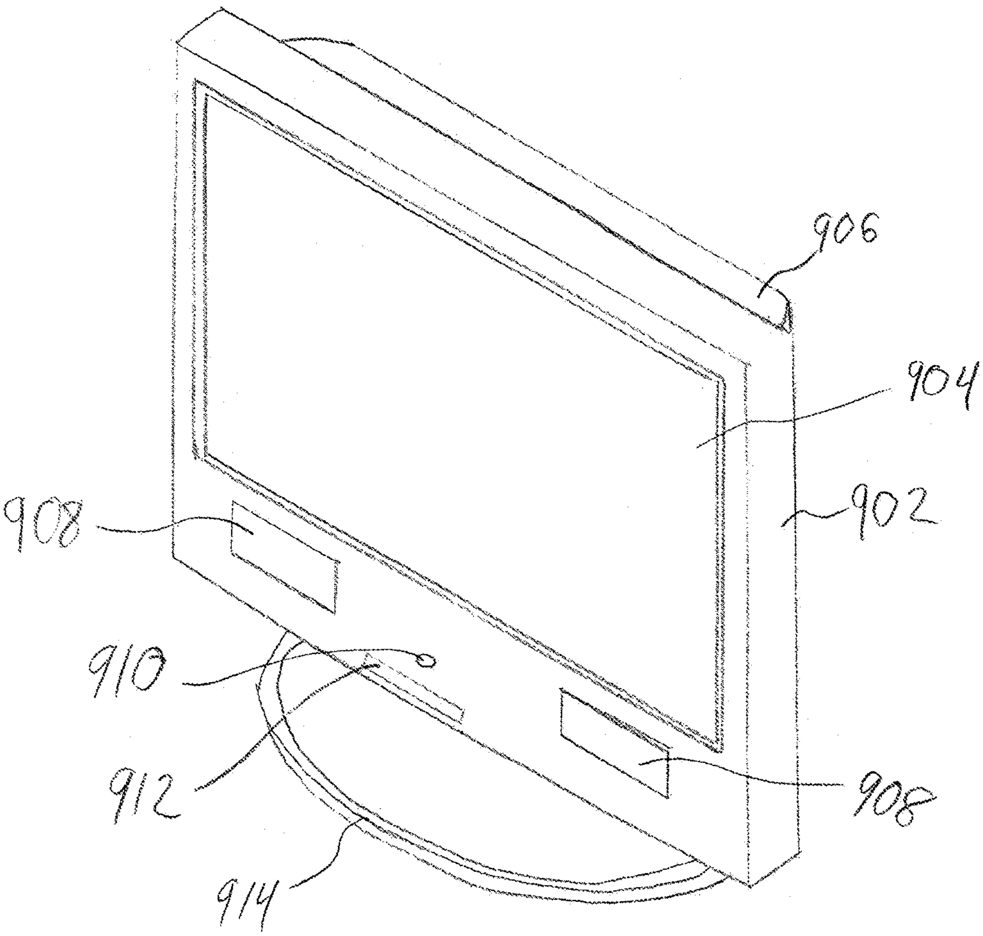
FIG. 9A illustrates a front perspective view of one embodiment of a receiving unit.

Referring now to FIG. 9A, there is illustrated a front perspective view of one embodiment of a receiving unit 900. The receiving unit 900 may be a display device much like a television or PC monitor. The receiving unit 900 includes a first rectangular housing 902, wherein components may be stored and a screen 904 installed within. The screen 904 may be a liquid crystal display (LCD) screen, an organic light emitting diode screen (OLED), or other screen types. The receiving unit 900 also includes a second housing 906 wherein additional components may be stored, may be used to allow for room for components, may allow for space for screws or other hardware to be inserted for mounting the receiving unit 900, and/or may allow for heat dissipation. The receiving unit 900 further includes one or more speakers 908 situated on a front surface of the first housing 902 and beneath the screen 904. In other embodiments, the one or more speakers 908 may be situated at other points on the receiving unit 900, such as above the screen 904, on the back of the receiving unit 900, such as on the second housing 906, or on a bottom, top, or right and left sides of the housing 902.

The embodiment of the receiving unit 900 shown in FIG. 9 also includes on the front surface of the housing 902 a power button 910 for turning the receiving unit 900 on and off. Although not shown, other buttons may be included in addition to the power button 910, such as volume +/− buttons, or in some embodiments no buttons may be included, requiring a remote control device to interact with the receiving unit 900. The receiving unit 900 may also include on the housing 902 an IR transmitter and receiver 912. The IR transmitter and receiver 912 may allow for the receiving unit 900 to be interacted with using a remote control device (not shown) or other IR devices. Additionally or alternatively, the remote control device may transmit wireless signals via RF, light, and/or a means other than IR. The receiving unit 900 may be connected to a removable stand 914 in order to keep the receiving unit 900 in place and upright.

Figure 9B:
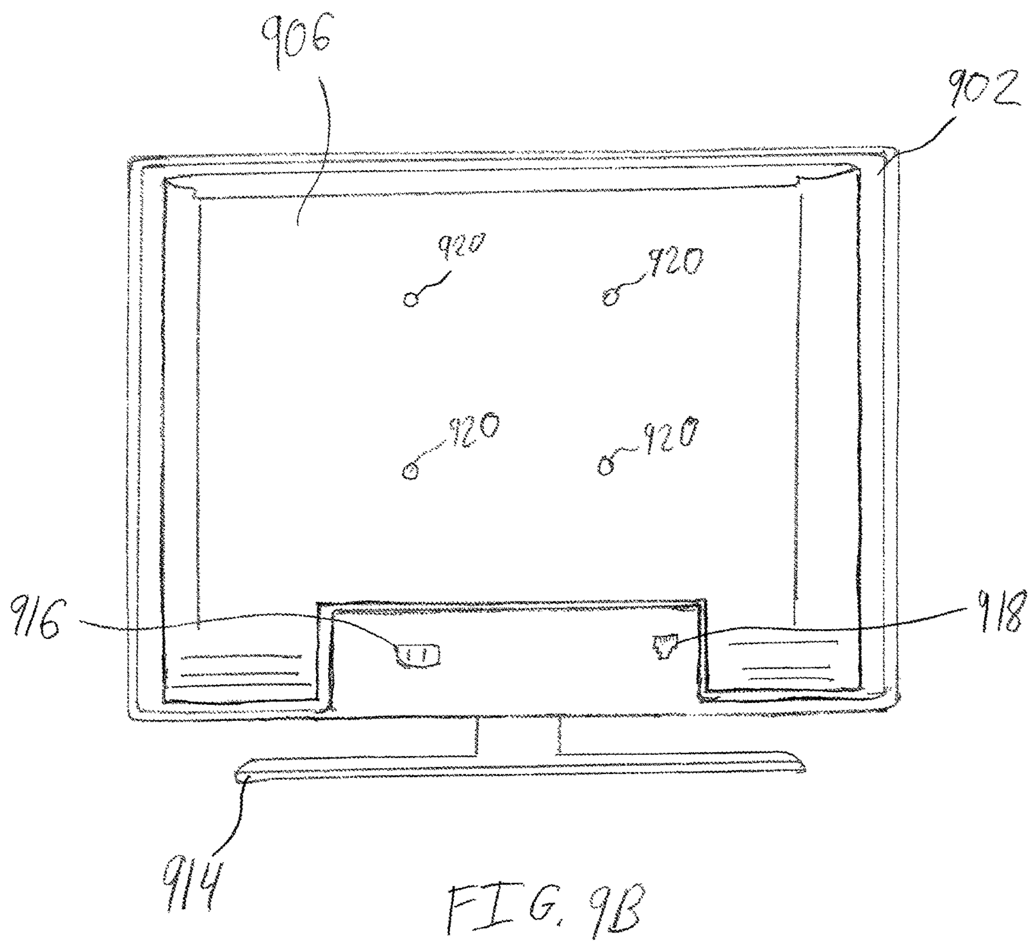
FIG. 9B illustrates a rear view of one embodiment of a receiving unit.

Referring now to FIG. 9B, there is illustrated a rear view of one embodiment of the receiving unit 900. The receiving unit 900 further includes a power port 916 for inserting a power cable and an Ethernet port 918 for inserting an Ethernet cable or other cable designed for connecting to a modem, router, or other device for providing a network or Internet connection to the receiving unit 900. The receiving unit 900 may also have an internal wireless network communications component(s) (not shown) for allowing the receiving unit 900 to connect to a wireless network configuration.

While in some embodiments the receiving unit 900 may include other ports for making additional connections to other devices, such as video or audio I/O ports, in some embodiments the receiving unit 900 only offers the two connections shown in FIG. 9B: the power port 916 and the Ethernet port 918. This is because, in these embodiments, the receiving unit 900 may be offered or sold as part of the streaming content service provided by the service provider 106, with the receiving unit 900 intended to be used only in connection with the streaming service, and not for other uses, such as watching DVDs or standard television programming. Thus, in these embodiments, the receiving unit 900 would not include a TV tuner and would not include access to other applications such as Netflix, Amazon Instant Video, YouTube, or other video service applications because the receiving unit 900 is only intended to be used in connection with the streaming service offered by the service provider 106.

The receiving unit 900 can internally include a streaming device or components. This internal streaming device would be proprietary to the service provider 106, only allowing for the receiving unit 900 to connect to the service provider's remote server 102 for streaming content provided by the service provider 106. In some embodiments, the receiving unit 900 may also include a plurality of threaded holes 920 on the back of the second housing 906, or another means of connecting something to the receiving unit 900, in order for the receiving unit 900 to be mounted to a wall or other surface. The removable stand 914 may be removed when the receiving unit is in a mounted configuration.

Figure 10:
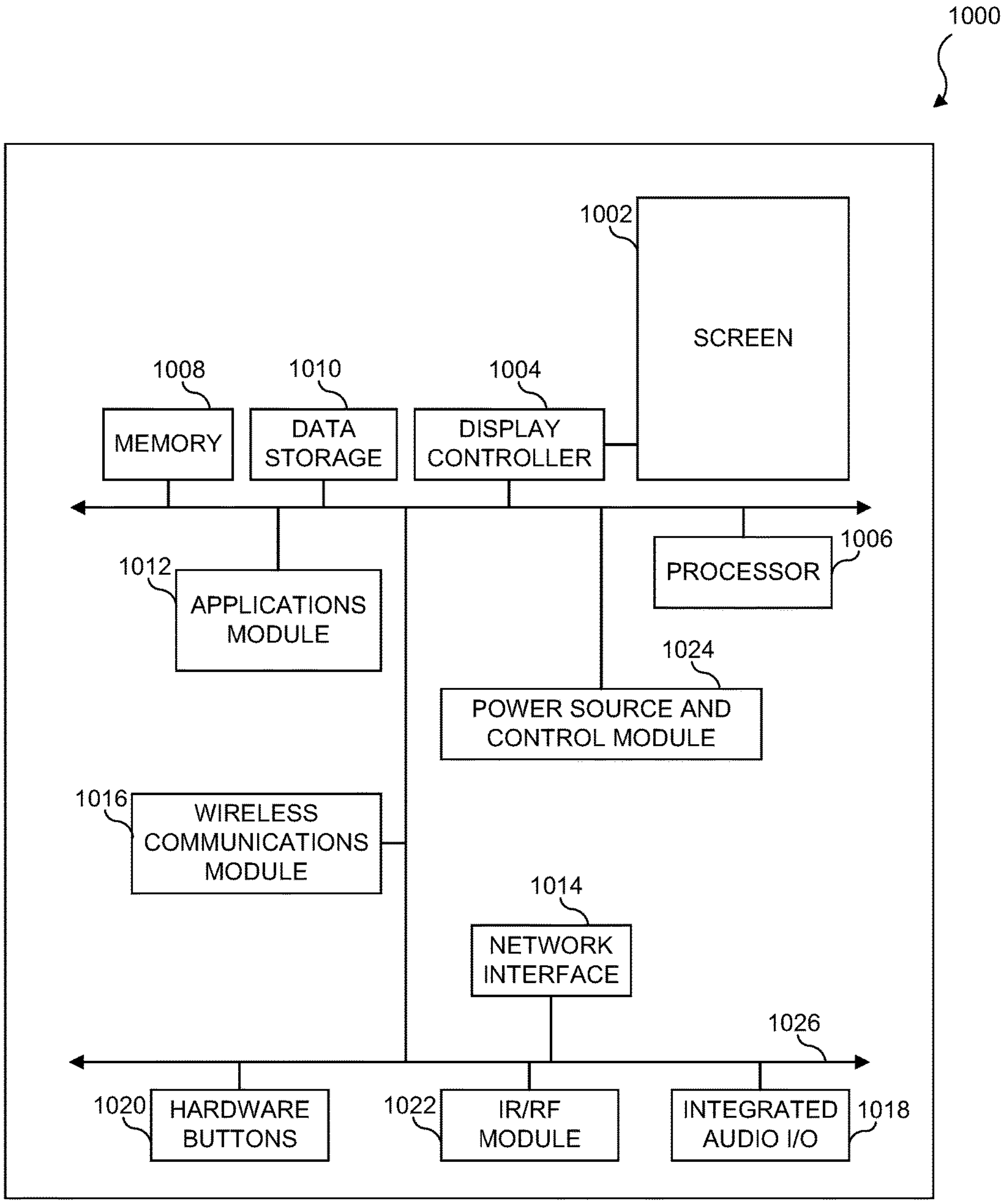
FIG. 10 illustrates a block diagram of one embodiment of an internal hardware configuration of one embodiment of a receiving unit.

Referring now to FIG. 10, and still to FIGS. 9A and 9B, there is illustrated a block diagram of one embodiment of an internal hardware configuration 1000 of the receiving unit 900. The configuration 1000 includes a screen 1002 (such as the screen 904 in FIG. 9A), connected to one or more display controllers 1004 for controlling the operation of the screen 1002. The display controller 1004 may control the operation of the screen 1002 and other inputs, such as infrared and/or radio input signals (e.g., door/gate controllers, alarm system components, etc.). In other embodiments, the functions of the display controller 1004 may be incorporated into other components, such as a processor 1006. The processor 1006 may comprise a programmable processor or controller for executing application programming or instructions. The processor 1006 may have multiple cores, and/or multiple virtual processors. The processor 1006 serves to run programming code, or other instructions implementing the functions of the receiving unit 900, such as in streaming content from the remote server 102.

The configuration 1000 may further include a memory 1008 and data storage 1010. The memory 1008 may be used in connection with the execution of application programming or instructions by the processor 1006 and an applications module 1012, and for temporary or long term storage of program instructions, manifest files and segment files during multimedia content playback, and/or other data such as SIC codes. For example, the memory 1008 may comprise RAM, DRAM, SDRAM, or other solid state type memory. The data storage 1010 may also be provided, which may be a similar memory types such as solid state memory, or may also be a hard disk drive or other random access memory. The data storage 1010 may also store program instructions, manifest files and segment files during multimedia content playback, and/or other data such as SIC codes. The applications module 1012 may be configured to include all components and programming for receiving streaming content from the remote server 102, as well as communicating with the remote server 102 for authentication, on-demand content requests, providing the SIC code associated with the receiving unit 900 to the remote server 102, and other purposes.

The applications module 1012 may also include encoding/decoding and/or compressions/decompression capabilities for receiving and managing digital content received. The encoding/decoding and compression/decompression capabilities enable decompression and/or decoding of digital or analog information received over a network interface 1014, a wireless communications module 1016, or other means. The digital information may be sent to the screen 1002 and/or the one or more speakers 908 over integrated audio I/O 1018. The network interface 1014 may include the Ethernet port 918. The wireless communications module 1016 may be similar to a wireless network card having an antenna for receiving and transmitting over a wireless signal. Any encoding/decoding and compression/decompression may be performable on the basis of various formats, such as video, audio, and other data. The applications module may also allow for encryption to ensure the confidentiality of all data received by or transmitted from the receiving unit 900. In other embodiments, the encoding/decoding and compression/decompression capabilities may be performed by a separate encoding/decoding and compression/decompression module separate from the applications module 1012. Similarly, encryption may be performed by a separate module as well.

The configuration 1000 may also include hardware buttons 1020 for use in connection with certain control parameters, such as power and volume controls. An IR/RF module 1022 may be included for controlling the IR transmitter and receiver 912 so that the receiving unit 900 can be interacted with using a remote control device (not shown) or other IR devices. Additionally or alternatively, the IR/RF module 1022 may facilitate receiving or transmitting wireless signals via RF, light, and/or a means other than IR. Additionally, power can be supplied to the receiving unit 900 and its components from a power source and/or power control module 1024. The power control module 1024 can, for example, include a battery, an AC-to-DC converter, power control logic, and/or ports (such as power port 916) for connecting the receiving unit 900 to an external source of power. Communications between components of the receiving unit 900 may be provided by a bus 1026. The bus 1026 may comprise one or more physical buses for control, addressing, and/or data transmission. The bus 1026 may be parallel serial, a hybrid thereof, or other technology.

Figure 11:
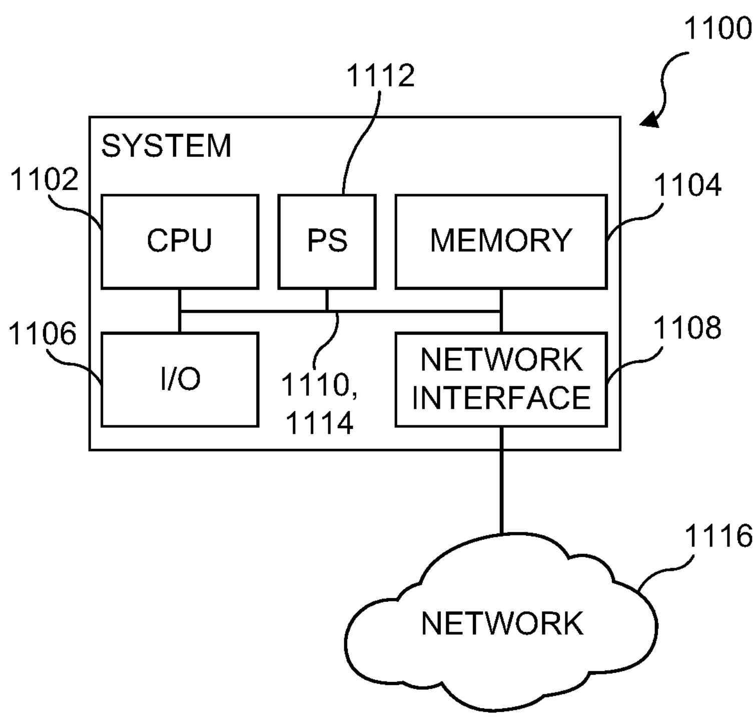
FIG. 11 illustrates a diagrammatic view of one embodiment of a system device that may be used within the environment described herein.

Referring now to FIG. 11, one embodiment of a system device 1100 is illustrated. The system device 1100 is one possible example of a device used by an end user, such as a another embodiment of the receiving unit 112 or 900, a device used by the service provider 106, the POS system 702, components within the receiving unit 112 or 900, such as the applications module 1012, or one possible example of the remote server 102. Embodiments include cellular telephones (including smart phones), televisions or monitors, personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the device may be implemented in many different ways and by many different types of systems, and may be customized as needed to operate within a particular environment.

The system 1100 may include a controller (e.g., a central processing unit ("CPU")) 1102, a memory unit 1104, an input/output ("I/O") device 1106, and a network interface 1108. The components 1102, 1104, 1106, and 1108 are interconnected by a transport system (e.g., a bus) 1110. A power supply (PS) 1112 may provide power to components of the computer system 1100, such as the CPU 1102 and memory unit 1104, via a power system 1114 (which is illustrated with the transport system 1110 but may be different). It is understood that the system 1100 may be differently configured and that each of the listed components may actually represent several different components. For example, the CPU 1102 may actually represent a multi-processor or a distributed processing system; the memory unit 1104 may include different levels of cache memory, main memory, hard disks, and remote storage locations; the I/O device 1106 may include monitors, keyboards, and the like; and the network interface 1108 may include one or more network cards providing one or more wired and/or wireless connections to a network 1116. Therefore, a wide range of flexibility is anticipated in the configuration of the computer system 1100.

The system 1100 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 1100. The operating system, as well as other instructions, may be stored in the memory unit 1104 and executed by the processor 1102. For example, the memory unit 1104 may include instructions for performing some or all of the methods described herein.

Although the embodiment has been described in detail, it should be understood that various changes, substitutions and alterations can be made therein without departing from the spirit and scope of this disclosure as defined by the appended claims.

What is claimed is:

1. An electronic device for industry-specific content streaming, comprising:
- a network interface;
- a display;
- a memory; and
- at least one processor coupled to the network interface and the memory, the at least one processor configured to:
  - transmit, over the network interface, a request for a digital content item to a remote server, wherein the request includes a specific classification code and the digital content item is classified according to the specific classification code;
  - receive, from the remote server over the network interface, a manifest file associated with the digital content item stored on the remote server, wherein the manifest file includes a location on the remote server for at least one segment file associated with the digital content item;
  - determine, using the manifest file, a location on the remote server of a segment file;
  - transmit, over the network interface to the remote server, a request for the segment file stored on the remote server;
  - receive, from the remote server over the network interface, the segment file in response to the request for the segment file; and
  - present contents of the segment file on the display of the electronic device,
  - wherein the digital content item is one of a plurality of digital content items stored on the remote server,
  - wherein each of the plurality of digital content items is provided according to at least one content schedule, and
  - wherein the at least one content schedule is associated with a classification code defining a target industry for the content schedule.

2. The electronic device of claim 1, wherein the specific classification code is a Standard Industrial Classification code (SIC code).

3. The electronic device of claim 1, wherein the at least one content schedule includes time-based programming blocks, wherein each of the time-based programming blocks is associated with a particular time of day.

4. The electronic device of claim 3, wherein content from the plurality of digital content items is scheduled within the time-based programming blocks, wherein a classification code associated with the content is matched to the classification code associated with the time-based programming blocks.

5. The electronic device of claim 4, wherein the content scheduled within at least one of the time-based programming blocks is restricted from being requested by the electronic device except during the particular time of day associated the at least one of the time-based programming blocks.

6. The electronic device of claim 5, wherein the at least one processor is further configured to:
- receive, at the particular time of day associated with the at least one of the time-based programming blocks, a manifest file associated with the content scheduled within the at least one of the time-based programming blocks; and
- transmit a request, using the manifest file associated with the content scheduled within the at least one of the time-based programming blocks, for a segment file associated with the content scheduled within the at least one of the time-based programming blocks.

7. The electronic device of claim 4, wherein the electronic device is associated with a specific classification code.

8. The electronic device of claim 7, wherein the content scheduled within at least one of the time-based programming blocks is restricted from being requested by the electronic device unless the classification code associated with the electronic device matches the classification code of the at least one of the time-based programming blocks.

9. The electronic device of claim 4, wherein the electronic device is connected to a point-of-sale (POS) system.

10. The electronic device of claim 9, wherein the at least one processor is further configured to:
- receive data from the POS system concerning a product or service sold;
- determine if the data indicates a trend in the products or services sold; and
- transmit the data to the remote server so that the remote server updates the content scheduled within the time-based programming blocks according to the trend.

11. The electronic device of claim 10, wherein updating the content scheduled within the time-based programming blocks according to the trend includes replacing certain content within at least one of the time-based programming blocks with content including subject matter pertaining to the trend.

12. The electronic device of claim 1, further comprising an infrared (IR) receiver for receiving commands from a peripheral IR transmitter.

13. The electronic device of claim 1, wherein the electronic device is restricted from uses other than content streaming.

14. The electronic device of claim 1, wherein the at least one processor is further configured to:
- repeat, until all segment files associated with the manifest file are received by the electronic device:
  - transmitting a request for another segment file stored on the remote server;
  - receiving from the remote server over the network interface the another segment file in response to the request for the another segment file; and
  - presenting contents of the another segment file on the display of the electronic device.

* * * * *